No. 861,131. PATENTED JULY 23, 1907.
J. W. LEONARD & H. E. BROWN.
FRICTION CLUTCH.
APPLICATION FILED MAY 9, 1907.

WITNESSES.

INVENTORS
John W. Leonard
Harry E. Brown
BY
ATTORNEYS

THE NORRIS PETERS CO., WASHINGTON, D. C.

UNITED STATES PATENT OFFICE.

JOHN WALTER LEONARD AND HARRY EDGAR BROWN, OF WASHINGTON, PENNSYLVANIA.

FRICTION-CLUTCH.

No. 861,131.          Specification of Letters Patent.          Patented July 23, 1907.

Application filed May 9, 1907. Serial No. 372,648.

*To all whom it may concern:*

Be it known that we, JOHN WALTER LEONARD and HARRY EDGAR BROWN, both citizens of the United States, and residents of Washington, in the county of Washington and State of Pennsylvania, have invented a new and Improved Friction-Clutch, of which the following is a full, clear, and exact description.

This invention relates to friction clutches designed to be used on convertible gas and steam engines, and has for its object to provide a device simple in construction, effective in operation and durable in use.

Figure 1:
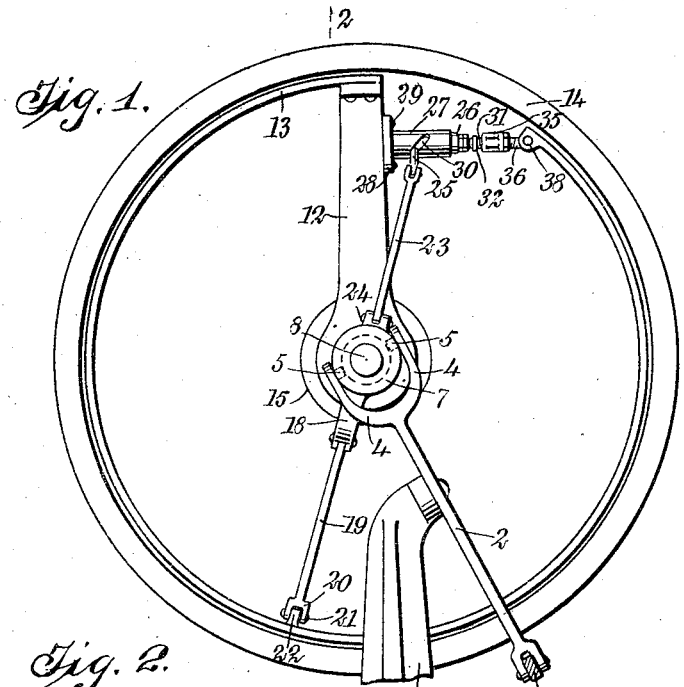
Figure 2:
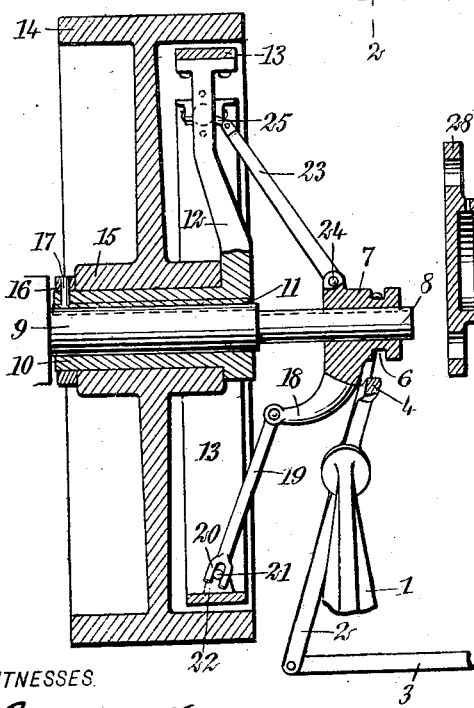
Figure 3:
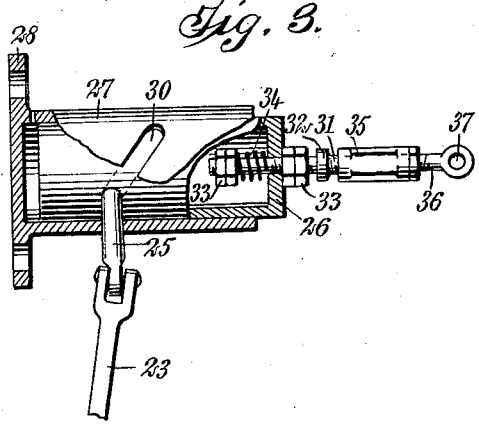

Other objects relating to the specific construction and special arrangement of the several parts of our invention will be understood from the following description and accompanying drawings, in which drawings like characters of reference indicate like parts throughout the views, and in which Figure 1 is a side elevation of a device embodying our invention; Fig. 2 is a vertical transverse section taken on the line 2—2 of Fig. 1; and Fig. 3 is an enlarged sectional view, partly in side elevation, of a tightening device forming part of our invention.

As illustrated in the drawings, the numeral 1 represents a pedestal upon which is pivotally mounted an operating lever 2 having a link 3 connected therewith at one end, the opposite end of said lever being provided with forked arms 4 having studs 5 which engage a groove 6 formed in a shifting collar 7, which is slidingly mounted upon the reduced end 8 of a driving shaft 9. A sleeve 10 is mounted upon the driving shaft 9 and fixedly secured thereto by means of a key 11. The sleeve 10 is provided with a supporting arm 12 having attached to its outer portion one end of a friction belt 13, adapted to bear against the inner periphery of a driving wheel 14, the central hub 15 of which is freely journaled upon the sleeve 10 mounted upon the driving shaft. A collar 16 is fixedly secured by means of a pin 17 to the sleeve 10, so as to prevent lateral movement of the hub 15 on said sleeve. An arm 18 is formed on the collar 7 and has pivotally attached thereto a link 19 provided with a bifurcated end 20 which engages a stud 21 of a lug 22 formed on the friction belt 13 or attached thereto. A link 23 is also pivotally connected with the collar 7 at its inner end by means of a pin 24, and the outer end of said link is pivotally attached to a lug 25 of a head 26, which is rotatably mounted in a socket 27 having a flange 28 attached to the side of the supporting arm 12 by means of rivets 29, as shown in Fig. 1. The socket 27 is provided with a cam groove 30 adapted to receive the lug 25 of the head 26. The outer end of said head is provided with an aperture adapted to receive a threaded bolt 31 having an annular shoulder 32, and lock nuts 33 on the outer and inner side of the end of the head. A spring 34 is mounted on said bolt inside of the head to hold the outer nuts against the end of the head 26 in their adjusted position on the bolt 31. The free end of the friction belt 13 is adjusted relatively to the end of the head 26 by means of a turn buckle 35 connected to the outer end of the bolt 31, and with a bolt 36 provided with an eye 37 which is pivotally attached to the free end of the friction belt 13 by means of a stud 38.

When the device is in use and it is desired to clamp the driving pulley 14 to the shaft 9, the collar 7 is slid longitudinally of the reduced end 8 of the driving shaft by means of the operating link 3, thereby spreading the outer ends of the links 19 and 23. The end of the lever 23 rotates the lug 25 in the cam groove 30, thereby forcing outward the head 26 to which said lug is attached and the free end of the friction belt 13, bringing said belt in contact with the inner periphery of the wheel 14 and binding said wheel to the driving shaft. A reverse movement of the shifting collar 7 by means of the operating link 3 releases the friction belt 13 from engagement with the driving wheel and allows said wheel to rotate idly on the sleeve 10 mounted on said shaft.

When the device is applied to convertible gas and steam engines used in connection with oil wells, considerably more strain is exerted upon the wheel in pulling out of the well the tubing and rods, and the steam cylinder is used for such purpose. In order to obtain a firm grip upon the wheel 14 to permit the engine being reversed quickly under heavy strain, the connection between the head 26 and the free end of the friction belt 13 is extended as far as possible so as to force said belt firmly against the periphery of the wheel 14 and hold it there. This is accomplished by adjusting the nuts 33 on the threaded bolt 31. When the friction belt 13 is so adjusted by means of the connection between the heads 26 and the free end of the belt 13, the collar 7 and links 19 and 23 become inoperative. When, however, the steam cylinder is disconnected and power is taken from the gas cylinder for lighter work, such as pumping, the outer nuts 33 are adjusted outwardly on the bolt 31 and brought in contact with the collar or shoulder 32 of said bolt, which serves as a gage or stop for making a quick adjustment of the parts without using the turn buckle 35 for that purpose.

By means of such construction, the clutch may be adjusted to be used with a gas engine or steam engine, by simply adjusting the outer nuts 33 in contact with or away from the fixed collar 32 of the bolt 31. When the outer nuts 33 are adjusted away from the collar 32, the connection between the head 26 and end of the belt 13 is extended so as to forcibly hold the belt 13 against the inner periphery of the wheel 14 without the aid of the shifting collar 17 and links 19 and 23. When the nuts 33 are in contact with the collar 32, the connection between the head 26 and the end of the belt 33 is shortened, thereby withdrawing the end of the belt from the inner periphery of the wheel 14, but leaving said end free to be applied to the inner periphery of said wheel by means of the controlling lever 2, shifting collar 7 and connecting links 19 and 23.

Having thus described our invention, what we claim as new and desire to secure by Letters Patent is:

1. The combination with a driving shaft, of a sleeve fixedly attached thereto and provided with a supporting arm, a wheel freely journaled on said sleeve, a friction belt attached at one end to the supporting arm, adjustable tightening mechanism connecting the free end of said belt with said supporting arm, a shifting collar mounted on said shaft, a link connecting said collar and belt, a link pivotally attached to said collar and connected with said tightening mechanism, and means for sliding said collar longitudinally of said shaft.

2. The combination with a driving shaft, of a shifting collar slidably mounted thereon, a sleeve fixed to said shaft and provided with a supporting arm, a wheel freely journaled on said sleeve, a friction belt secured at one end to said supporting arm, tightening mechanism connected with said supporting arm and the free end of said belt, comprising a casing fixedly attached to said supporting arm, and a head movable longitudinally of said casing and adjustably connected with the free end of said belt, and links connecting said collar with said belt and tightening mechanism.

3. The combination with a driving shaft, of a shifting collar slidably mounted thereon, a sleeve fixed to said shaft and provided with a supporting arm, a wheel freely journaled on said sleeve, a friction belt secured at one end to said supporting arm, tightening mechanism comprising a casing having a cam groove, a head engaging said casing and provided with a lug engaging said groove, and adjusting mechanism connecting said head with the free end of said belt, and links connecting said collar with said belt and tightening mechanism.

4. The combination with a driving shaft, of a shifting collar slidably mounted thereon, a sleeve fixed to said shaft and provided with a supporting arm, a wheel freely journaled on said sleeve, a friction belt secured at one end to said supporting arm, tightening mechanism connecting the free end of said belt with the supporting arm, comprising a casing attached to the said arm, a head having a rotary longitudinal movement in said casing, and an adjustable connection between said head and the free end of said belt, and links connecting said collar with said belt and tightening mechanism.

5. The combination with a driving shaft, of a shifting collar slidably mounted thereon, a sleeve fixed to said shaft and provided with a supporting arm, a wheel freely journaled on said sleeve, a friction belt secured at one end to said supporting arm, tightening mechanism connecting the free end of said belt with said supporting arm, and links connected with said collar, and with said belt and supporting arm respectively.

In testimony whereof we have signed our names to this specification in the presence of two subscribing witnesses.

JOHN WALTER LEONARD.
HARRY EDGAR BROWN.

Witnesses:
JOHN H. DONNAN,
RICHARD G. MILLER.